(12) United States Patent
Lai et al.

(10) Patent No.: US 7,954,326 B2
(45) Date of Patent: Jun. 7, 2011

(54) SYSTEMS AND METHODS FOR COOLING GAS TURBINE ENGINE TRANSITION LINERS

(75) Inventors: Mark Lai, Phoenix, AZ (US); David G. Walhood, Scottsdale, AZ (US); Hiroshi Kawamura, Glendale, AZ (US); Albert K. Wong, Chandler, AZ (US); Mark A. Kuper, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 800 days.

(21) Appl. No.: 11/946,364

(22) Filed: Nov. 28, 2007

(65) Prior Publication Data
US 2009/0133404 A1 May 28, 2009

(51) Int. Cl.
*F02C 1/00* (2006.01)
*F02G 3/00* (2006.01)
(52) U.S. Cl. .................. 60/752; 60/760; 60/754
(58) Field of Classification Search .......... 60/752–760
See application file for complete search history.

(56) References Cited

U.S. PATENT DOCUMENTS

| | | | |
|---|---|---|---|
| 3,844,116 A * | 10/1974 | Matto | 60/800 |
| 3,869,864 A * | 3/1975 | Bunn | 60/757 |
| 5,237,813 A | 8/1993 | Harris et al. | |
| 5,323,602 A | 6/1994 | Defever | |
| 5,918,467 A | 7/1999 | Kwan | |
| 6,155,056 A * | 12/2000 | Sampath et al. | 60/756 |
| 6,408,629 B1 | 6/2002 | Harris et al. | |
| 6,655,149 B2 | 12/2003 | Farmer et al. | |
| 6,810,672 B2 | 11/2004 | Coutandin | |
| 6,925,810 B2 | 8/2005 | Swaffar | |
| 6,955,053 B1 | 10/2005 | Chen et al. | |
| 7,146,816 B2 | 12/2006 | Anderson et al. | |
| 7,155,913 B2 | 1/2007 | Beule et al. | |
| 7,260,936 B2 | 8/2007 | Patel et al. | |
| 7,269,958 B2 * | 9/2007 | Stastny et al. | 60/804 |
| 7,302,801 B2 * | 12/2007 | Chen | 60/733 |
| 7,350,358 B2 * | 4/2008 | Patel et al. | 60/760 |
| 7,624,577 B2 * | 12/2009 | Patel et al. | 60/752 |
| 7,628,020 B2 * | 12/2009 | Alkabie et al. | 60/752 |
| 2006/0037323 A1 | 2/2006 | Reynolds et al. | |
| 2006/0042257 A1 * | 3/2006 | Stastny | 60/772 |
| 2006/0272335 A1 | 12/2006 | Schumacher et al. | |
| 2007/0130953 A1 | 6/2007 | Burd et al. | |
| 2007/0169484 A1 | 7/2007 | Schumacher et al. | |
| 2010/0050650 A1 * | 3/2010 | Patel et al. | 60/754 |

* cited by examiner

*Primary Examiner* — William H Rodriguez
(74) *Attorney, Agent, or Firm* — Ingrassia Fisher & Lorenz, P.C.

(57) ABSTRACT

A gas turbine engine assembly includes a combustor configured to combust an air-fuel mixture to produce combustion gases in a first direction; a transition liner coupled to the combustor and adapted to receive the combustion gases from the combustor and to redirect the combustion gases in a second direction; and a turbine coupled to the transition liner and adapted to receive the combustion gases from the transition liner. The transition liner has a plurality of effusion holes that include a first group that extend at least partially in a tangential direction.

19 Claims, 5 Drawing Sheets

SYSTEMS AND METHODS FOR COOLING GAS TURBINE ENGINE TRANSITION LINERS

TECHNICAL FIELD

The present invention generally relates to gas turbine engines, and more particularly relates to systems and methods for cooling gas turbine engine transition liners.

BACKGROUND

A gas turbine engine may be used to power aircraft or various other types of vehicles and systems. The engine typically includes a compressor that receives and compresses incoming gas such as air; a combustion chamber in which the compressed gas is mixed with fuel and burned to produce exhaust gas; and one or more turbines that extract energy from the high-pressure, high-velocity exhaust gas exiting the combustion chamber.

The arrangement and configuration of these sections impact many characteristics of the gas turbine engine, including overall engine length and weight, as well as the materials to construct the turbine engine. The overall length of the turbine engine may be shortened, thereby saving on materials, weight and length, by the use of a reverse flow annular combustion chamber. This type of combustion chamber is so named because the general direction of flow within and out of the chamber is opposite to the general direction of air flow that subsequently enters the turbine. Typically, a transition liner is fitted to the downstream portion of the annular combustion chamber and serves to redirect the flow of combustion gas into the turbine section, thereby resulting in a gas flow aligned with the turbine and the general direction of overall flow through the engine. The transition liner is typically configured as an annular ring with a concave hot side facing the combustion chamber.

The engine is subject to extreme temperatures, particularly at the transition liner that receives and redirects the combustion products. The high temperatures may cause thermal stresses and other problems. Conventional system and methods for cooling the transition liner, such as heat shields, louvers and impingement cooling, have been met with mixed success, at best.

Accordingly, it is desirable to provide improved systems and methods for cooling the transition liner. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with one exemplary embodiment, a gas turbine engine assembly includes a combustor configured to combust an air-fuel mixture to produce combustion gases in a first direction; a transition liner coupled to the combustor and adapted to receive the combustion gases from the combustor and to redirect the combustion gases in a second direction; and a turbine coupled to the transition liner and adapted to receive the combustion gases from the transition liner. The transition liner has a plurality of effusion holes that include a first group that extend at least partially in a tangential direction.

In accordance with another exemplary embodiment, a reverse-flow combustor assembly includes a first liner; and a second liner circumscribed by the first liner to form a combustion chamber therebetween. The combustion chamber is configured to combust an air-fuel mixture to produce combustion gases exiting form the combustion chamber in a first direction. A transition liner is coupled to the combustion chamber and configured to receive the exiting combustion gases and to redirect the combustion gases in a second direction, generally opposite to the first direction. The transition liner has a plurality of effusion holes that include a first group that extend at least partially in a tangential direction.

In accordance with yet another exemplary embodiment, a gas turbine engine assembly includes a combustor configured to combust an air-fuel mixture to produce combustion gases in a first direction; a transition liner coupled to the combustor and adapted to receive the combustion gases from the combustor and redirect the combustion gases in a second direction; and a turbine coupled to the transition liner and adapted to receive the combustion gases from the transition liner. The transition liner defines a plurality of effusion holes that include a first group having a tangential orientation and with a compound angle, a second group downstream of the first group and having a radial orientation, and a third group radially between the first and second group and transitioning in orientation between approximately tangential and approximately radial.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, the exemplary embodiments discussed herein provide cooling schemes for transition liners in gas turbine engines. More particularly, the transition liners are provided with effusion holes for supplying a continuous film of cooling air to the liner surface. The effusion holes can have at least one group oriented in a tangential direction and one group in a radial direction, and may additionally include effusion holes with compound angles. Embodiments discussed herein may find beneficial use in many industries and applications, including aerospace, automotive, and electricity generation.

Figure 1:
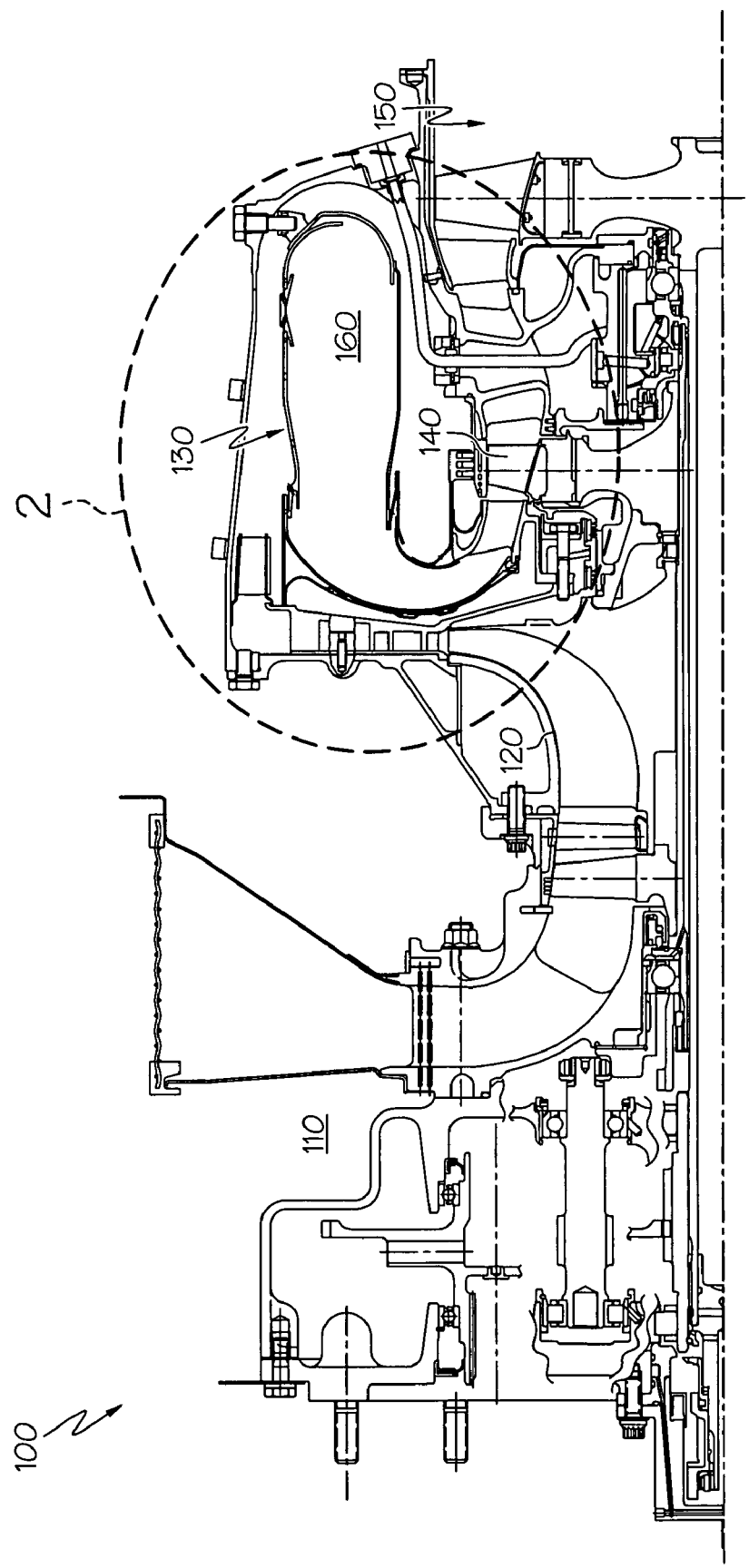
FIG. 1 is a cross-sectional view of a gas turbine engine in accordance with an exemplary embodiment.

FIG. 1 is a cross-sectional view of an engine 100 in accordance with an exemplary embodiment. In one embodiment, the engine 100 is a multi-spool gas turbine main propulsion engine. The engine 100 includes an intake section 110, a compressor section 120, a combustion section 130, a turbine section 140, and an exhaust section 150.

The intake section 110 includes a fan that draws air into the engine 100 and accelerates it into the compressor section 120. The compressor section 120 may include one or more compressors that raise the pressure of the air directed into it, and directs the compressed air into the combustion section 130. In the depicted embodiment, a two-stage compressor is shown, although it will be appreciated that one or more additional compressors could be used.

The combustion section 130, which is discussed in greater detail below, includes a combustor unit 160 that mixes the compressed air with fuel supplied from a fuel source (not shown). The fuel/air mixture is combusted to generate high energy combusted gas that is then directed into the turbine section 140. The combustor unit 160 may be implemented as any one of numerous types of combustor units. However, as will be discussed in more detail further below in one embodiment, the combustor unit 160 is implemented as a reverse flow combustor unit. The turbine section 140 includes one or more turbines in which the combusted gas from the combustion section 130 expands and causes the turbines to rotate. The gas is then exhausted through the exhaust section 150.

Figure 2:
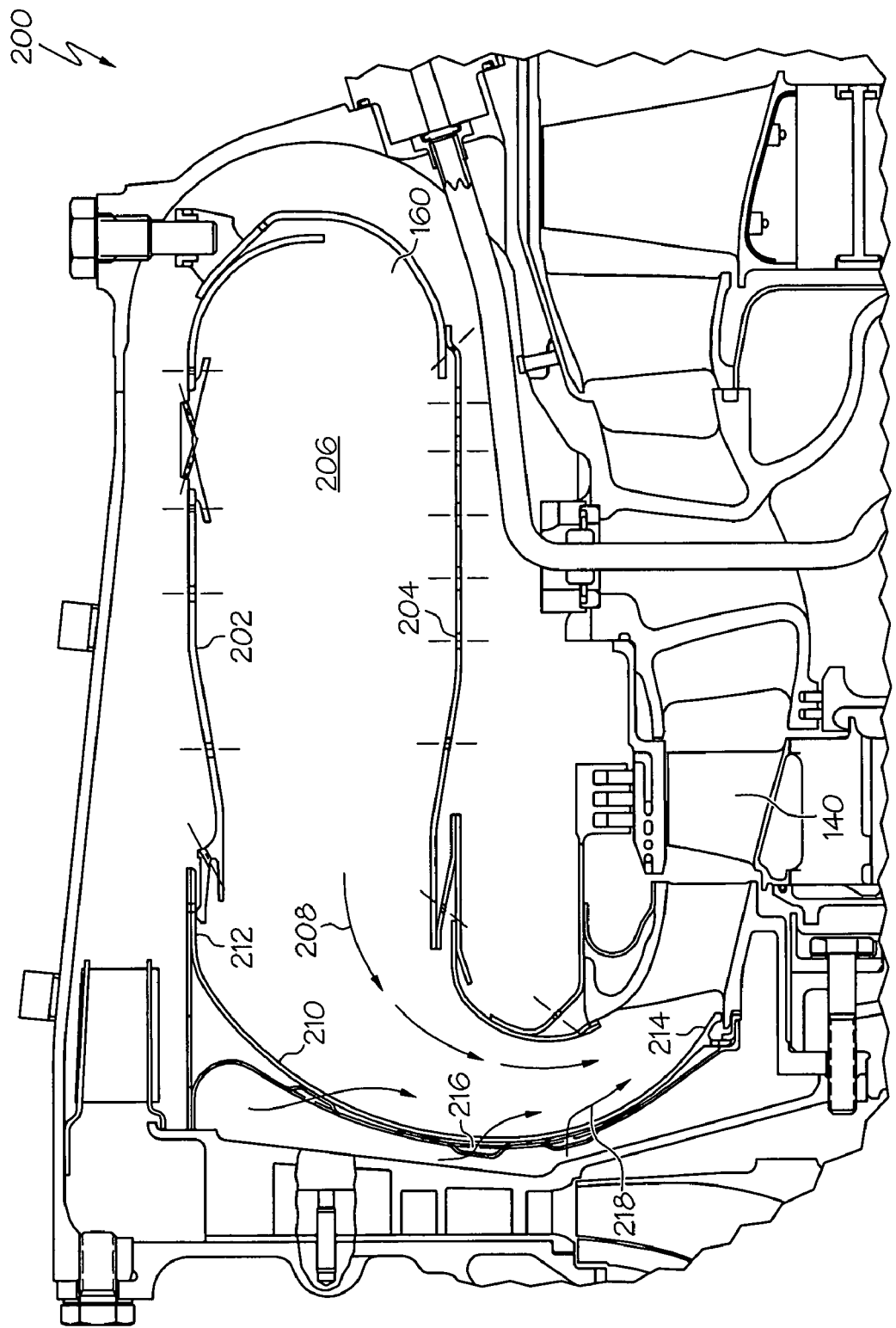
FIG. 2 is a more detailed cross-sectional view of a portion of the engine of FIG. 1.

FIG. 2 is a more detailed cross-sectional view of a portion of the engine 100 of FIG. 1, and particularly illustrates section 2 in FIG. 1. The reverse flow combustor unit 160 and portions of the turbine section 140 are depicted and will now be described in more detail.

In one embodiment, the combustor unit 160 includes an outer liner 202 and an inner liner 204 circumscribed by the outer liner 202. The outer liner 202 and the inner liner 204 form a combustion chamber 206 therebetween. In the combustion chamber 206, the compressed air is mixed with fuel and combusted to generate combustion gas 208.

The combustion gas 208 then flows into a transition liner 210, which receives the combustion gas 208 and diverts it in an opposite direction into the turbine section 140. More specifically, in this particular engine 100, the direction of the combustion gas flow 208 is reversed with respect to the overall orientation of the turbine engine 100. The combustion gas 208 is directed from an upstream section 212 of the transition liner 210 to a downstream section 214 of the transition liner 210. In the depicted embodiment, the upstream section 212 of the transition liner 210 is coupled to the outer liner 202, while the downstream section 214 is coupled to the turbine section 140.

As also shown in FIG. 2 and discussed in greater detail below, the transition liner 210 has a number of effusion holes 216 to permit compressed air to pass through for cooling the interior surface of the transition liner 210. In particular, the effusion holes 216 allow a buffering layer 218 of cool air to pass from the exterior surface to the interior surface of the transition liner 210, and then in a generally downstream direction with the hot combustion gasses 208 from the combustion chamber 206 into the turbine section 140. This layer 218 of cooler air reduces the direct contact of the hot combustion gasses 208 with interior surface of transition liner 210 as well as convectively cools the wall of the transition liner 210 as the air passes through the holes 216.

Unlike the prior art systems and methods that require heat shields and/or louvers, the effusion holes 216 may simplify cooling in that no additional components need be attached to the transition liner in some embodiment; such components may be provided in addition, however, in embodiments where more cooling is desired. Manufacturing costs may be reduced due to a decrease in part count and an overall simplified design. The durability of the transition liner 210 may be extended by a reduction in temperature gradients along the surface.

Figure 3:
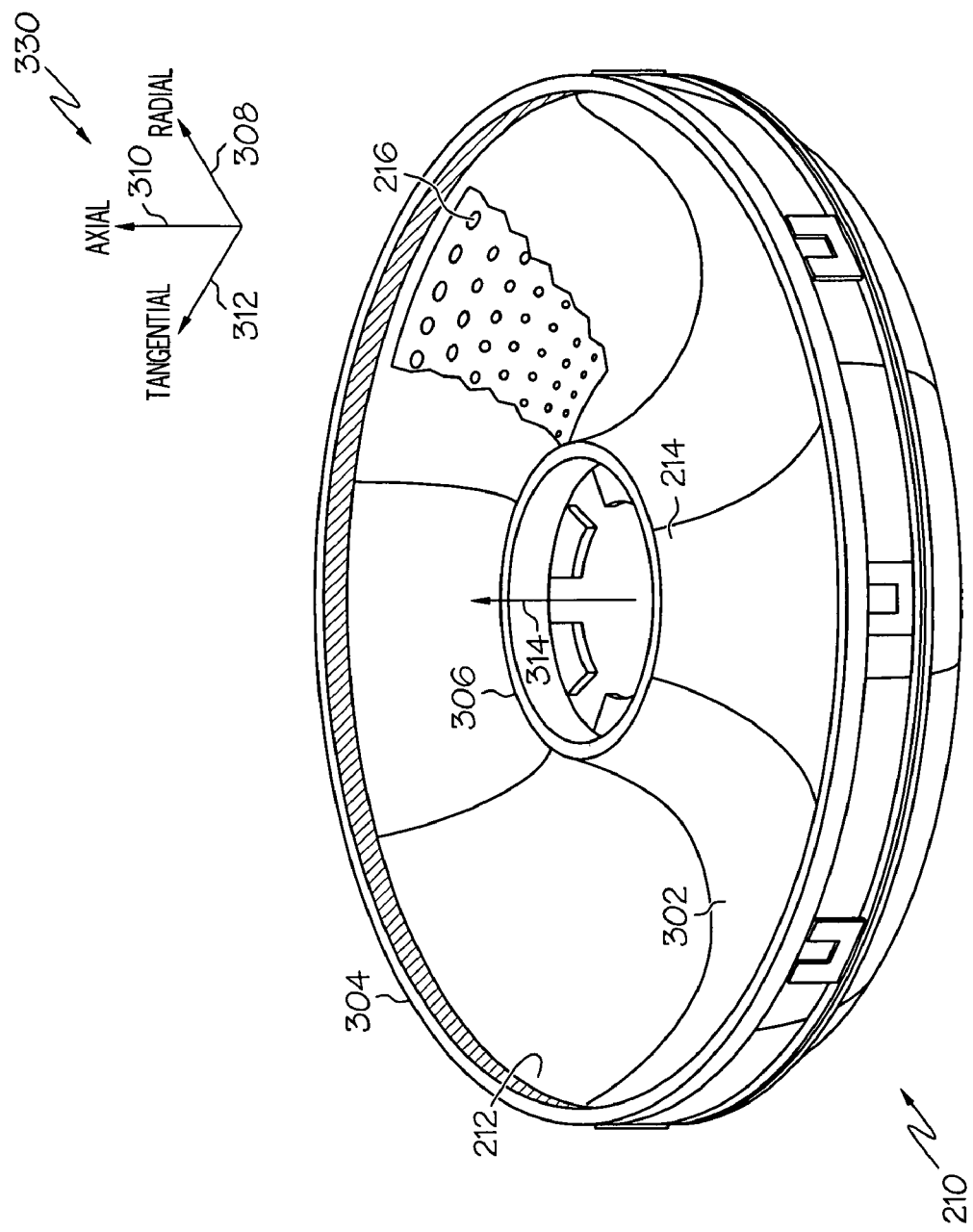
FIG. 3 is an isometric view of an exemplary transition liner.

FIG. 3 is an isometric view of the transition liner 210 removed from the engine 100. As noted above, the transition liner 210 is configured as ring with a concave hot surface 302 that faces the combustion chamber 206 (FIG. 2). The transition liner 210 includes a first edge 304 adjacent the upstream section 212 and a second edge 306 adjacent the downstream section 214.

Figure 4:
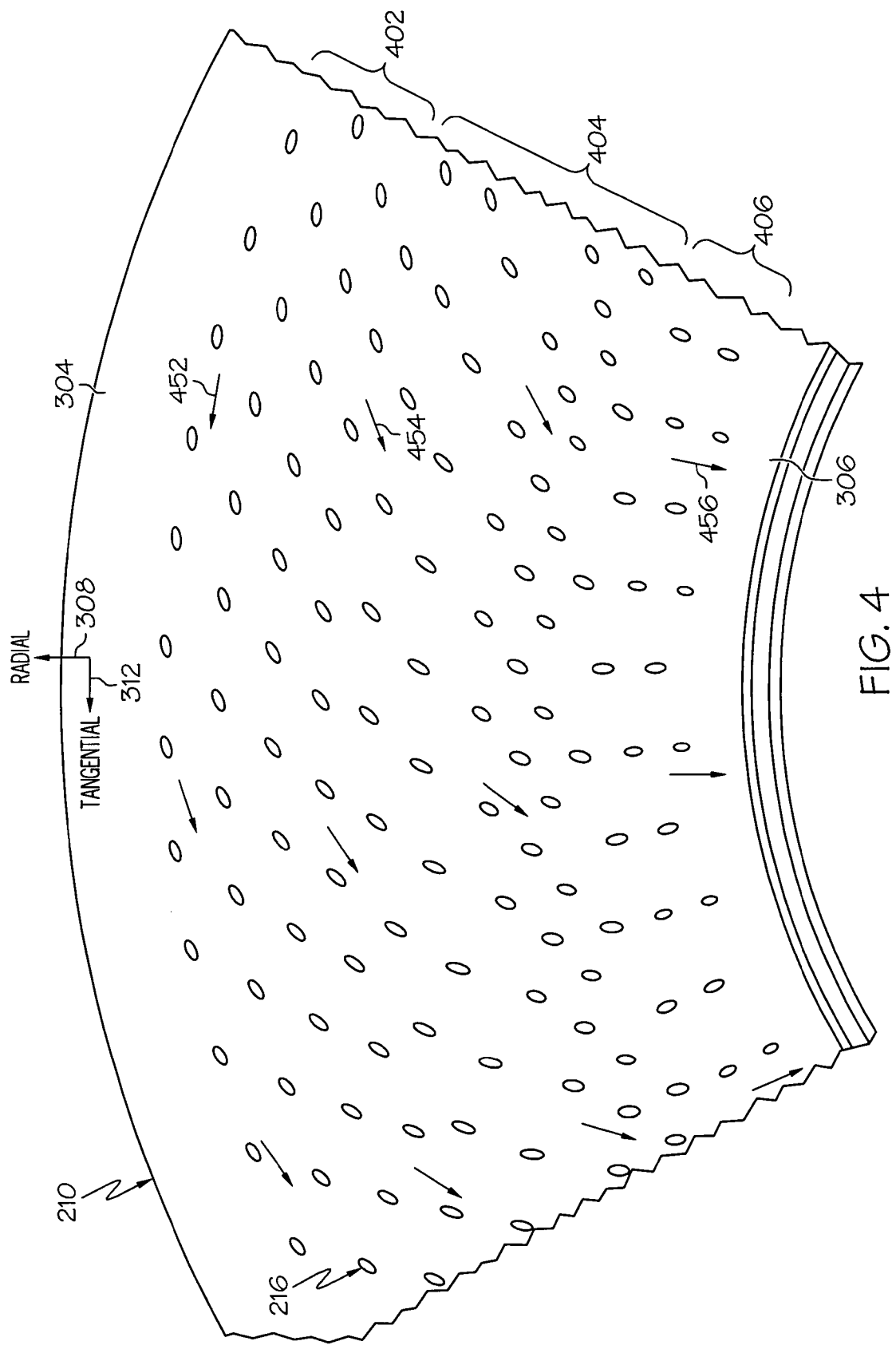
FIG. 4 is a partial plan view of the transition liner in a tangential-radial plane.
Figure 5:
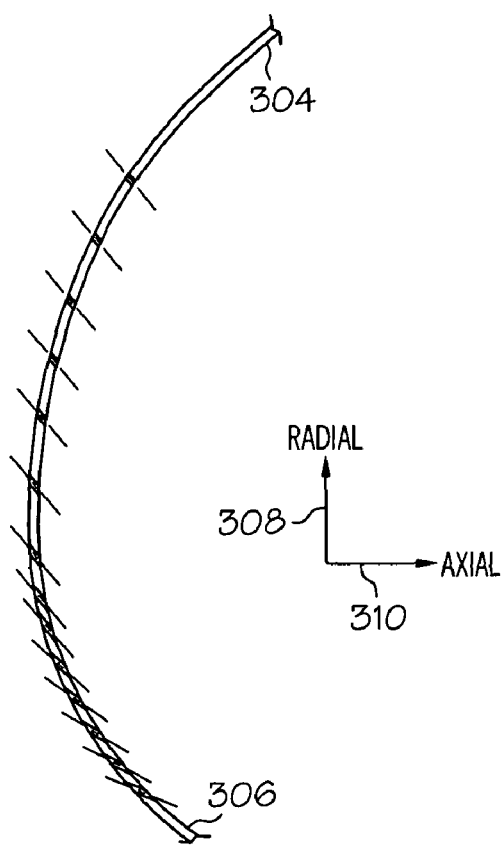
FIG. 5 is a partial cross-sectional view of the transition liner in a radial-axial plane.
Figure 6:
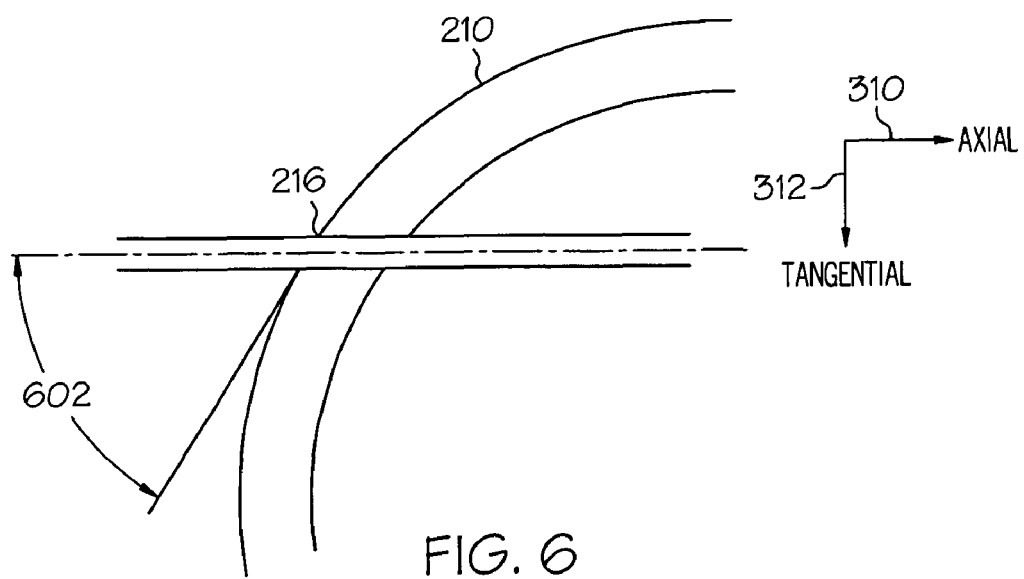
FIG. 6 is a partial cross-sectional view of the transition liner in an axial-tangential plane.

Characteristics of the transition liner 210 can be considered in three dimensions, as indicted by the legend 350 and discussed further in FIGS. 4-6. A radial direction 308 extends between the first edge 304 and the second edge 306 along the surface of the transition liner 210, i.e. radially inward and outward within the circular configuration of the transition liner 210. The radial direction 308 also corresponds to the downstream direction of the combustion gases during operation from the first edge 304 to the second edge 306. An axial direction 310 extends outwardly from the surface of the transition liner 210. A tangential direction 312 extends around the surface of the transition liner 210 and around the center axis 314. Although FIG. 3 shows a representation of the effusion holes 216, the orientation and arrangement are discussed in greater detail with reference to FIGS. 4-6. Particularly, as discussed in FIGS. 4-6, the effusion holes 216 can be oriented in one or more of the radial direction 308, axial direction 310, and tangential direction 312 to result in a compound angle for at least some of the effusion holes 216, thereby resulting in improved cooling characteristics.

FIG. 4 is a partial plan view of the transition liner in a tangential-radial plane and more clearly show the effusion holes 216. As discussed above, the effusion holes 216 are generally relatively small, closely spaced holes serving to direct a flow of cooling air onto the walls of transition liner 210. The cooling holes are generally 0.01 to 0.04 inches in diameter, although the diameter may vary with application and may depend on factors such as the dimensions of the transition liner 210, the temperature of the combustion gases 208 (FIG. 2), and the velocity of the cooling flow 218 (FIG. 2). Individual hole shape is generally cylindrical or oval, with minor deviations due to manufacturing method i.e. edge rounding, tapers, out-of-round or oblong, etc. Other embodiments could use holes shaped other than circular or oval.

The effusion holes 216 can be patterned to improve cooling. Particularly, the effusion holes 216 can be arranged in groups 402, 404, 406 having tangentially staggered rows. A first group 402 of effusion holes is adjacent the first edge 304 of the transition liner 210 and has an orientation that is approximately completely tangential. In other words, the first group 402 of effusion holes has angles of approximately 0° relative to a tangential axis and can direct cooling air around the transition liner 210, as indicated by arrow 452. In one embodiment, the first group 402 has between 2 and 10 rows of effusion holes.

A second group 404 of effusion holes is downstream of the first group 402 and transitions between an approximately tangential direction and an approximately radial direction, i.e., between approximately 0° relative to a tangential axis to approximately 90° relative to a tangential axis, as indicated by arrow 454. In one embodiment, the second group 404 has between 2 and 10 rows of effusion holes.

A third group 406 of effusion holes is downstream of the second group 404 and adjacent the second edge 306. The third group 406 has an orientation that is approximately completely radial. In other words, the third group 406 of effusion holes 216 has angles approximately 90° relative to the tangential axis, and can direct cooling air downstream the transition liner 210, as indicated by arrow 456. In one embodiment, the third group 406 has between 2 and 10 rows of effusion holes.

As a result of this arrangement, the cooling air passing through the effusion holes 216 of the first and second groups 402, 404 have at least some tangential component. As such, the cooling air may linger for a longer period of time on the surface of the transition liner 210 to provide improved cooling. However, the effusion holes 216 the second and third groups 404, 406 transition from a more tangential direction 452 to a radial direction 456 such that the cooling air is transitioned into the direction of the combustion gases exiting the combustor and entering the turbine. As a result, the cooling air does not interfere with the aerodynamics of the combustion gases.

FIG. 5 is a partial cross-sectional view of the transition liner 210 in a radial-axial plane. In this embodiment, the angle of the effusion holes 216 in the radial-axial plane can vary from about 35° to about 60° relative to an axial axis. Generally, the effusion holes 216 have a greater angle adjacent the first edge 304 and transition to a lesser angle adjacent the second edge 306.

FIG. 6 is a partial cross-sectional view of the transition liner 210 in an axial-tangential plane. The angle 602 of these effusion holes 216 can vary from about 0° to about 65° from a tangential axis in the axial-tangential plane. In one embodiment, the angle along the axial-tangential plane can increase from the second edge 306 (e.g., FIG. 3) to the first edge 304 (e.g. FIG. 3). As with the other components of the compound angle of the effusion holes 216, the angle 602 in the axial-tangential plane increases the length of the hole 216 through the transition liner 210, thereby increasing the surface area from which the cooling flow can extract heat from the transition liner 210.

The effusion holes 216 may be formed by drilling techniques such as electrical-discharge machining (EDM), stationary percussion laser machining and percussion on-the-fly laser drilling or with complex casting techniques. The density of the effusion holes 216 may vary with application and may depend on factors including the dimensions of the transition liner 210, the material of manufacture of the transition liner 210, the velocity of the cooling flow, and the temperature of the combustion gases. For some applications, the effusion holes 216 may be uniformly spaced. Alternatively, the effusion holes 216 may be unevenly spaced to provide more cooling flow to "hot spots" on the transition liner 210.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine assembly, comprising:
a combustor configured to combust an air-fuel mixture to produce combustion gases in a first direction;
a transition liner coupled to the combustor and adapted to receive the combustion gases from the combustor and to redirect the combustion gases in a second direction, the transition liner having a plurality of effusion holes that include a first group that extend at least partially in a tangential direction and a second group; and
a turbine coupled to the transition liner and adapted to receive the combustion gases from the transition liner, wherein the transition liner has a first edge coupled to the combustor and a second edge coupled to the turbine, the first group being positioned adjacent the first edge, and
wherein the effusion holes of the first group have a first angle in the radial-axial plane adjacent the first edge and the effusion holes of the second group have a second angle in the radial-axial plane adjacent the second edge, the first angle being greater than the second angle.

2. The engine assembly of claim 1, wherein the effusion holes of the first group are completely oriented in the tangential direction.

3. The engine assembly of claim 1, wherein the effusion holes of the first group have a compound angle.

4. The engine assembly of claim 1, wherein the effusion holes of the second group that extends at least partially in a radial direction.

5. The engine assembly of claim 4, wherein the effusion holes of the second group are completely oriented in the radial direction.

6. The engine assembly of claim 4, wherein the effusion holes include a third group that transitions in direction between the first group and the second group.

7. The engine assembly of claim 1, wherein the transition liner is configured as a curl ring.

8. The engine assembly of claim 1, wherein the effusion holes have a diameter of about 0.015 inches to about 0.040 inches.

9. The engine assembly of claim 1, wherein the effusion holes of the first group are oriented with a compound angle being between about 35°-65° in an axial-radial plane and about 0°-65° in an axial-tangential plane.

10. The engine assembly of claim 1, wherein the effusion holes of the first group have a third angle in the axial-tangential plane adjacent the first edge and the effusion holes of the second group have a fourth angle in the axial-tangential plane adjacent the second edge, the third angle being greater than the fourth angle.

11. A reverse-flow combustor assembly, comprising:
a first liner;
a second liner circumscribed by the first liner to form a combustion chamber therebetween, the combustion chamber configured to combust an air-fuel mixture to produce combustion gases exiting form the combustion chamber in a first direction;
a transition liner coupled to the combustion chamber and configured to receive the exiting combustion gases and to redirect the combustion gases in a second direction, generally opposite to the first direction, the transition liner having a plurality of effusion holes that include a first group that extend at least partially in a tangential direction and a second group,
wherein the transition liner has a first edge coupled to the first liner and a second edge circumscribed by the first edge, the first group being positioned adjacent the first edge, and
wherein the effusion holes of the first group have a first angle in the axial-tangential plane adjacent the first edge and the effusion holes of the second group have a second angle in the axial-tangential plane adjacent the second edge, the first angle being greater than the second angle.

12. The combustor assembly of claim 11, wherein the effusion holes of the first group are completely oriented in the tangential direction.

13. The combustor assembly of claim 11, wherein the effusion holes of the first group have a compound angle.

14. The combustor assembly of claim 11, wherein the effusion holes of the second group extend at least partially in a radial direction.

15. The combustor assembly of claim 14, wherein the effusion holes of the second group are completely oriented in the radial direction.

16. The combustor assembly of claim 14, wherein the effusion holes include a third group that transitions in direction between the first group and the second group.

17. The combustor assembly of claim 14, wherein the transition liner is configured as a curl ring.

18. A gas turbine engine assembly, comprising:
a combustor configured to combust an air-fuel mixture to produce combustion gases in a first direction;
a transition liner coupled to the combustor and adapted to receive the combustion gases from the combustor and to redirect the combustion gases in a second direction, the transition liner having a plurality of effusion holes that include a first group that extend at least partially in a tangential direction and a second group; and
a turbine coupled to the transition liner and adapted to receive the combustion gases from the transition liner,
wherein the transition liner has a first edge coupled to the combustor and a second edge coupled to the turbine, the first group being positioned adjacent the first edge, and
wherein the effusion holes of the first group have a first angle in the axial-tangential plane adjacent the first edge and the effusion holes of the second group have a second angle in the axial-tangential plane adjacent the second edge, the first angle being greater than the second angle.

19. The gas turbine engine assembly of claim 18, wherein the effusion holes of the first group have a third angle in the radial-axial plane adjacent the first end and the effusion holes of the second group have a fourth angle in the radial-axial plane adjacent the second edge, the third angle being greater than the fourth angle.

* * * * *